United States Patent [19]

Dätwyler

[11] Patent Number: 4,805,312
[45] Date of Patent: Feb. 21, 1989

[54] ENGRAVING HEAD FOR APPARATUS FOR ENGRAVING PRINTING CYLINDERS

[75] Inventor: Max Dätwyler, Langenthal, Switzerland

[73] Assignee: MDC Max Dätwyler Bleienbach AG, Bleienbach, Switzerland

[21] Appl. No.: 58,569

[22] Filed: Jun. 5, 1987

[30] Foreign Application Priority Data

Jun. 9, 1986 [DE] Fed. Rep. of Germany ....... 3619320

[51] Int. Cl.$^4$ .............................................. B41C 1/02
[52] U.S. Cl. ...................................... 33/18.1; 33/21.1; 358/299; 83/881; 409/141
[58] Field of Search ....................... 33/18.1, 21.1, 21.4, 33/23.11, 626, 628, 629, 630, 642, 572; 409/184, 185, 210, 218, 125, 141, 79, 96; 358/299; 30/164.9; 83/879, 881

[56] References Cited

U.S. PATENT DOCUMENTS

| | | | |
|---|---|---|---|
| 2,396,584 | 3/1946 | Lipp | 409/184 |
| 2,575,546 | 11/1951 | Boyajean | 358/299 |
| 2,881,246 | 4/1959 | Fairchild | 358/299 |
| 3,269,020 | 8/1966 | Anthony | 33/23.11 |
| 3,643,546 | 2/1972 | Richter et al. | 409/141 |
| 3,668,956 | 6/1972 | Whipple et al. | 83/881 |
| 4,139,245 | 2/1979 | McCloskey | 384/203 |
| 4,438,460 | 3/1984 | Buechler | 358/299 |
| 4,457,199 | 7/1984 | Corcoran | 83/881 |

Primary Examiner—William A. Cuchlinski, Jr.
Assistant Examiner—Patrick R. Scanlon
Attorney, Agent, or Firm—Benoit Law Corporation

[57] ABSTRACT

In an engraving head for apparatus for engraving printing cylinders, a drivable engraving tool and a sensing organ contacting any printing cylinder being engraved by the drivable engraving tool are mounted on a common fixture. A damping element is located between the sensing organ and the engraving tool for at least substantially barring transmission of oscillations from the sensing organ to the engraving stylus, while preserving a firm and accurate guidance of the drivable engraving tool by the sensing organ contacting the printing cylinder. Damped sleeve structures and collets for mounting a sensing stylus include such damping elements.

8 Claims, 3 Drawing Sheets

ENGRAVING HEAD FOR APPARATUS FOR ENGRAVING PRINTING CYLINDERS

BACKGROUND OF THE INVENTION

The subject invention concerns an engraving head for engraving gravure or intaglio printing cylinders and other pinting devices and also a sensing stylus sleeve structure and collet for use in such an engraving head.

Electronically controlled mechanical engraving machines, some of which have become known under their trade name "Klischograph," are used for engraving intaglio or rotogravure cylinders. They include an engraving head, or typically several engraving heads located side by side in parallel to a longitudinal axis of the printing cylinder.

Each engraving head has an engraving stylus and a sensing organ or stylus mounted on a common fixture. That fixture can be placed at the printing cylinder for applying the sensing organ or stylus at a predetermined pressure to the printing cylinder surface.

Up and down movement of the engraving stylus is generated by a control signal derived from an image signal produced by scanning a master. A raster signal which determines raster width is superimposed on the image signal. The continuously oscillating engraving stylus cuts into the surface of the gravure or intaglio cylinder pursuant to that control signal, so that raster cells or wells are cut which vary in depth and cross-section or cell volume in accordance with tone value.

Prints made with printing cylinders engraved by such known methods have shown a striated pattern consisting of stripes of differing color values.

As seen relative to the printing cylinder, these stripes extend in the longitudinal axis thereof. In Eurpose, this phenomenon has become known as "Jalousieeffekt"; that is, a "venetian blind effect." This kind of striated pattern effect is caused by periodically occurring unevenness of the cylinder surface or deviations from the geometrically exact cylinder form, which affect the cutting and thereby the formation of the raster cells.

SUMMARY OF THE INVENTION

It is an object of the subject invention to provide an improved engraving head and other devices of the type herein mentioned, by means of which the degrading effects of unevenness of the printing cylinder surface are effectively avoided.

The subject invention is based on the recognition that the scanning or sensing organ, applied to the printing cylinder at a certain pressure and following unevenness of the cylinder surface, is put into oscillations which are transmitted to the mounting fixture which thereby is excited into natural or self-oscillations. The oscillations of the mounting fixture, in turn, are transmitted to the engraving tool or stylus, whereby the controlled oscillatory movements thereof are influenced or affected. This, in turn, affects the engraving process and the shaping of the raster cells or wells.

According to the main aspect of the subject invention, an engraving head for apparatus for engraving printing cylinders, comprises, in combination, a drivable engraving tool, a sensing organ contacting any printing cylinder being engraved by the drivable engraving tool, means for effecting a firm and accurate guidance of the drivable engraving tool by the sensing organ contacting the printing cylinder, including a common mounting fixture for the drivable engraving tool and the sensing organ, and damping means between the sensing organ and the engraving tool for at least substantially barring transmission of oscillations from the sensing organ to the engraving tool, while preserving said firm and accurate guidance of the drivable engraving tool by the sensing organ contacting the printing cylinder. In this combination, the sensing organ includes a sensing stylus, an inner sleeve for retaining the sensing stylus, and an outer sleeve for mounting the inner sleeve and the sensing stylus in the common mounting fixture, and the damping means include an elastically deformable, energy absorbent element between the inner and outer sleeves.

By provision of such damping means in the stated combination, which at least largely suppresses or in effect prevents transmission of oscillations of the sensing organ to the mounting fixture and thereby to the engraving tool, that engraving tool is decoupled from the sensing organ so that surface inaccuracies of the printing cylinder, which would excite the sensing organ to oscillation, no longer are able to affect the engraving process.

The invention also may be stated in terms of a system or method, wherein a drivable engraving tool and a sensing organ contacting any printing cylinder being engraved by the drivable engraving tool are mounted on a common fixture, and objectionable striation patterns in prints made with such printing cylinders are avoided by locating a damping element between the sensing organ and the engraving tool for at least substantially barring transmission of oscillations from the sensing organ to the engraving stylus, while preserving a firm and accurate guidance of the drivable engraving tool by the sensing organ contacting the printing cylinder.

It is thereby important that the damping arrangement absorb oscillations of the sensing organ completely or at least to a material extent, since oscillations of the sensing organ can otherwise still transmit themselves to the mounting fixture, even if at a reduced frequency. Embodiments of the invention herein disclosed may be employed for that purpose to advantage.

In this respect, or according to a related apsect of the invention, a damping sleeve structure for mounting a sensing stylus relative to a fixture, comprises, in combination, an inner sleeve for receiving the sensing stylus, an outer sleeve insertable into a bore in that fixture, and an element between these inner and outer sleeves for at least substantially barring transmission of oscillations from the sensing stylus to that fixture.

Also according to a related aspect of the invention, a device for securing a damped sensing stylus mounting sleeve structure in a bore of a fixture, comprises, in combination, a collet receivable in that bore coaxially with the sleeve structure, and having an inside diameter leaving a circular interspace between the sensing stylus and the collet, and damping means received in a circular slot inside the collet and extending to the sensing stylus for preventing transmission of oscillations from the sensing stylus to the fixture.

BRIEF DESCRIPTION OF THE DRAWINGS

The invention and preferred embodiments thereof are explained with the aid of the accompanying drawings, in which.

DESCRIPTION OF PREFERRED EMBODIMENTS

Figure 1:
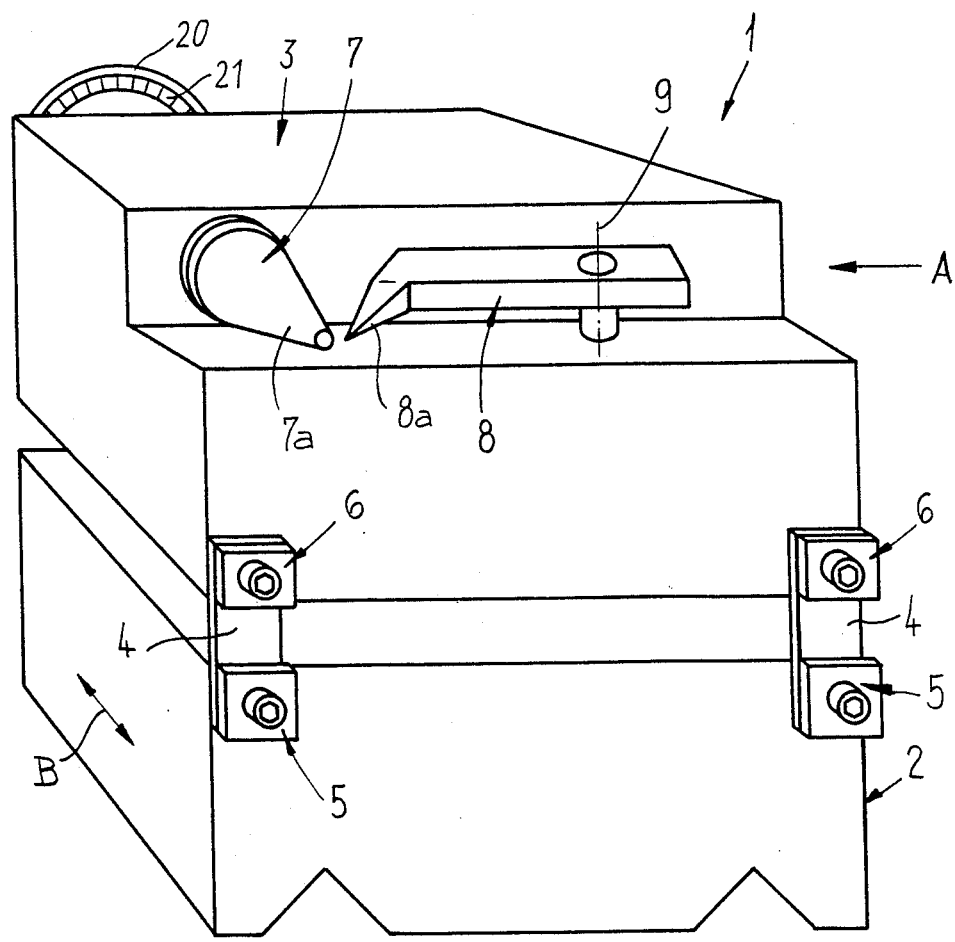
FIG. 1 is a schematic perspective view of a known engraving head for an electronically controlled engraving machine.

The illustrated engraving head 1 may, for instance, be used in electronically controlled mechanical engraving machines, such as those known under their trade name of "Klischograph."

That engraving head has a carriage 2 supporting a fixture 3. The carriage 2 is movable in the direction of arrow B and is guided by means of a conventional guide (not shown). The fixture 3 is connected to the carriage 2 by leaf springs 4, which are attached to the carriage 2 and to the fixture 3 by fasteners 5 and 6, respectively, shown only diagrammatically. The fixture 3 is thus tiltable in a well-known manner about an axis extending at right angles to the direction of movement of the carriage 2.

An elongate sensing organ or stylus 7 is held in the fixture 3 and has a tip 7a projecting therefrom. An engraving stylus 8 is mounted on the fixture 3 next to the sensing stylus 7 and has a cutting tip 8a. The engraving stylus 8 performs angular movements about an axis 9 in a manner known per se and therefore not illustrated in detail.

Figure 2:
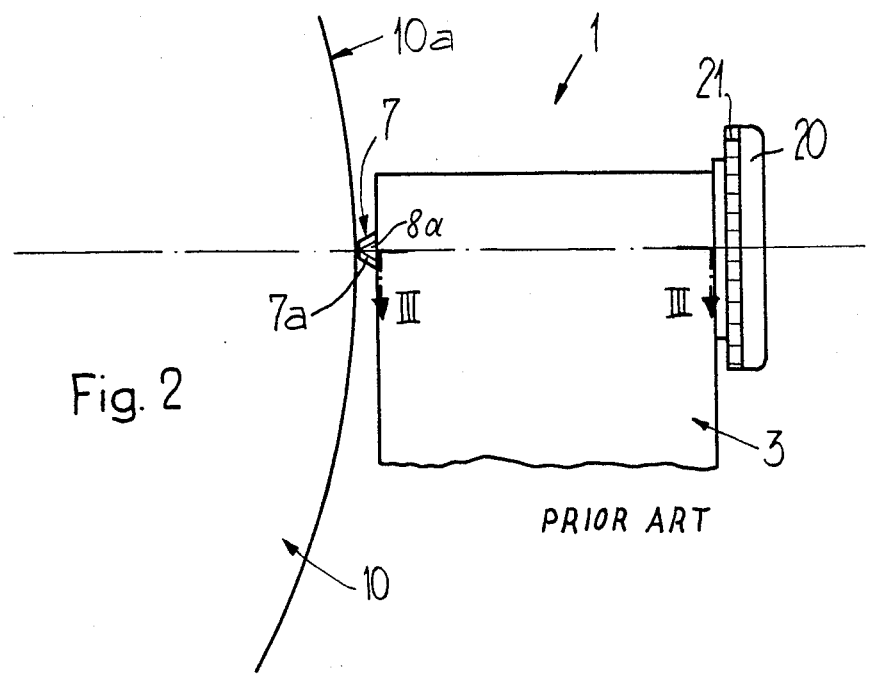
FIG. 2 is another view of the known engraving head as approximately seen in the direction of arrow A in Fig. 1.
Figure 3:
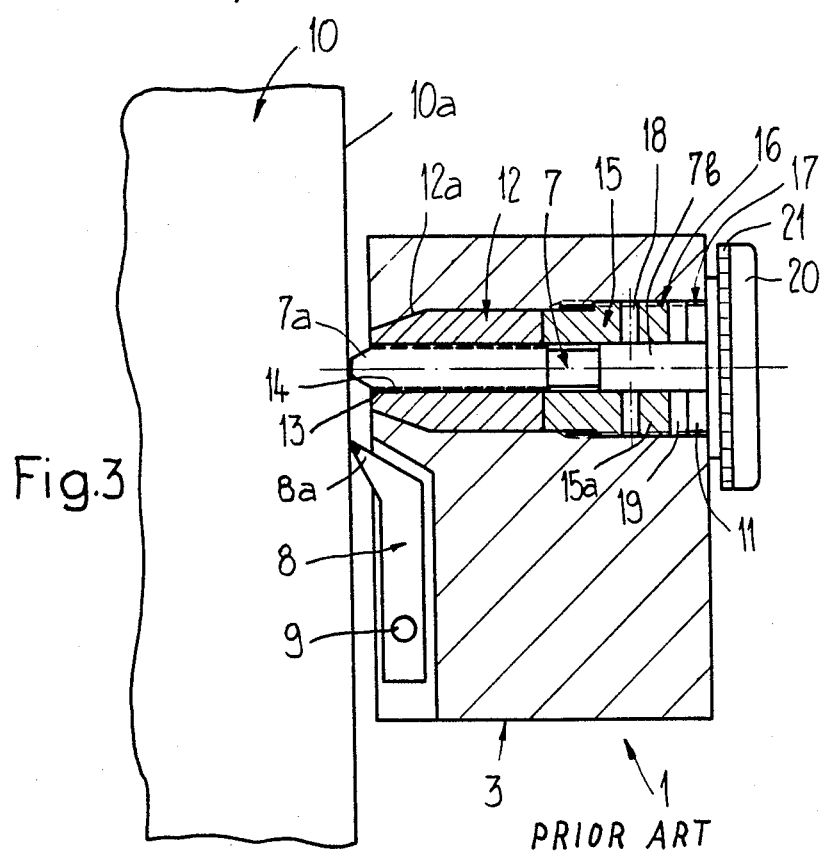
FIG. 3 is a sectional plan view of the known engraving head approximately taken on the line III—III in FIG. 2.

As seen in FIGS. 1 to 3, the fixture 3, through displacement of the carriage 2 in the direction of arrow B and tilting about the tilt axis determined by leaf springs 4, is moved toward the intaglio printing cylinder 10 to be engraved, until the sensing stylus 7 with its tip 7a contacts the printing cylinder 10 on its surface 10a at a specific pressure. As seen in FIG. 3, which shows the conventional known manner of mounting the sensing stylus 7, the fixture 3 has a through-bore 11 extending from back to front of that fixture for a mounting of the sensing stylus 7 extending therethrough.

A taper sleeve 12, encompassing the shaft 7b of the sensing stylus 7, sits in the bore 11 and is conically tapered at an end 12a adjacent the tip 7a of the sensing stylus 7. The through-bore 11 has a corresponding conical taper. The tapered sleeve 12 is provided with an internal thread 13, that is a fine thread, with which an external thread 14 mates, that is formed on the shaft 7b of the sensing stylus 7. A clamping sleeve or collet 15 is arranged further and coaxial to the tapered sleeve 12. At an end thereof, the collet 15 is provided with an external thread 16 which mates and cooperates with a thread 17 at the inside of the bore 11. The collet 15 is further provided with a transverse bore 18 as well as with axial slits 19 in an end thereof, for engagement by a tool for threading the collet 15 into the bore 11.

The shaft 7b of the sensing stylus 7 is in contact with the collet 15 at a rear end thereof, and is guided at that rear end 15a. The sensing stylus 7 further is connected to a handwheel 20 with which the sensing stylus 7 may be rotated and threaded into the collet 15 more or less. A scale 21 on the fixture 3 cooperates with the handwheel 20.

In the known design of mounting the sensing stylus 7 shown in FIG. 3, oscillations thereof, caused by unevenness of the cylinder surface 10a and deviations from a geometrically exact cylinder surface, are transmitted through the tapered sleeve 12 as well as through the collet 15 to the fixture 3. The latter thereby can be excited to natural or self-oscillations, which are transmitted to the engraving stylus 8 and which superimpose themselves on the controlled oscillatory movements of the engraving stylus. Thus the engraving process and thereby the depth and/or surface area of raster cells or wells engraved into the printing cylinder 10 are adversely affected.

Figure 4:
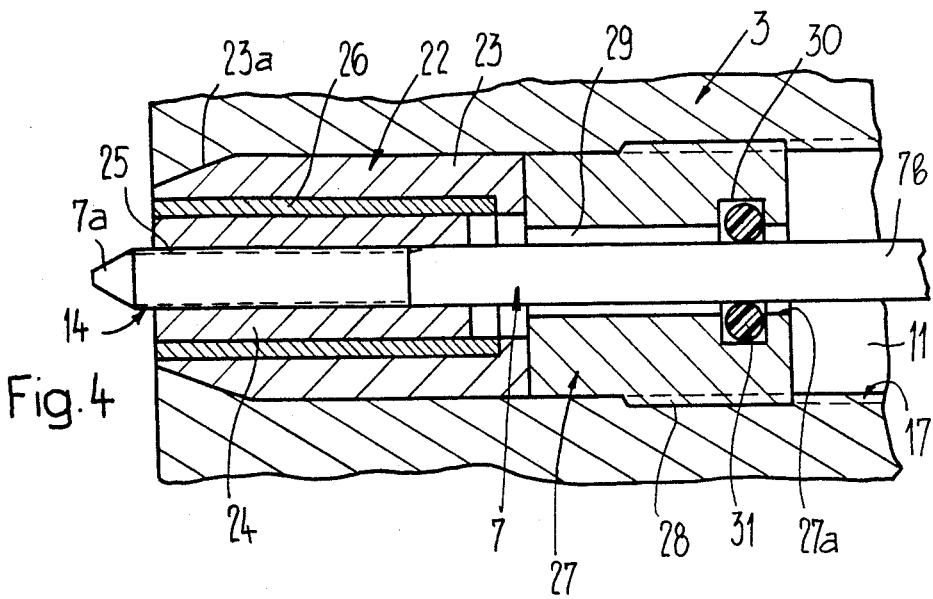
FIG. 4 is a view similar to a detail view of FIG. 3, but showing on an enlarged scale a damping structure combination according to a preferred embodiment of the invention.
Figure 5:
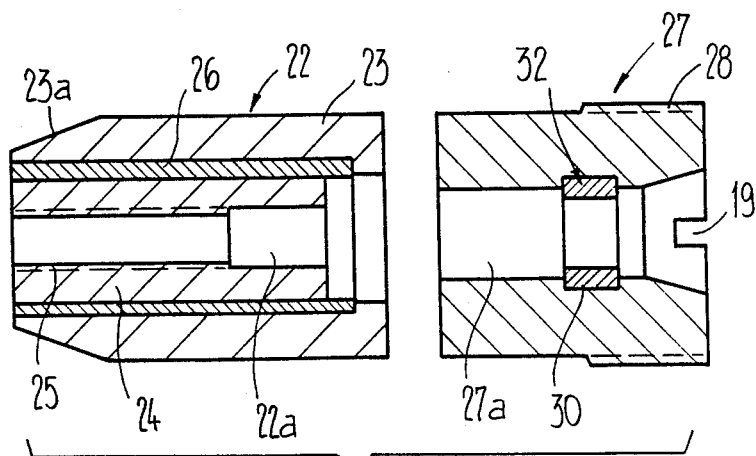
FIGS. 5 and 6 illustrate variations within the scope of the subject invention.
Figure 6:
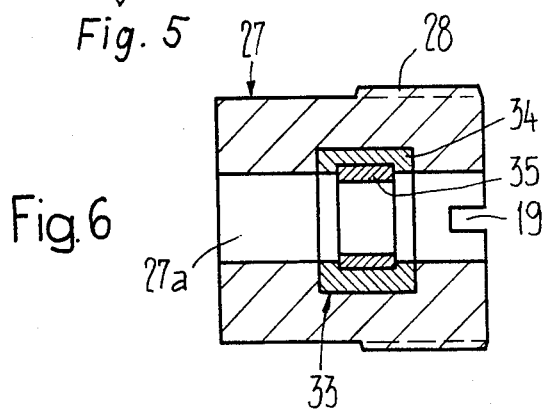

FIGS. 4 to 6 illustrate solutions pursuant to the subject invention which avoids a transmission of oscillations from the sensing stylus 7 to the fixtures 3 and the engraving stylus 8. The embodiments of the invention shown in Figs. 4 to 6 distinguish themselves from the known design according to FIGS. 2 and 3 by a different structure and formation of the taper sleeve and the collet. Like reference numerals are used in FIGS. 2 to 6 for like parts.

In the embodiment of the invention shown in FIGS. 4 to 6, the sensing stylus 7 is also mounted in a sleeve 22 which is inserted in the through-bore 11 in the fixture 3. The sleeve 22, having an axial opening or passage 22a, comprises two parts 23 and 24 which are interconnected with each other. The outer sleeve part 23 is also conically tapered at its end 23a adjacent the tip 7a of the sensing stylus 7. The inner sleeve part 24 is provided with an internal thread 25, which is also a fine thread, into which the shaft 7b of the sensing stylus 7 is threaded with its outer thread 14. Between the two sleeve parts or sections 23 and 24, a sleeve-like damping element 26 is arranged and, on the one hand, interconnects the two sleeve parts 23 and 24 with each other, while in effect separating them from each other, on the other hand as well. This damping element 26 comprises an elastically deformable, energy absorbent material, which preferably is an elastomer. Butyl rubber has proved itself as a particularly suitable material. However, it is possible to use natural or nitrile rubber or other rubber or rubber-like materials. The term "elastomer" is hereinafter employed generically to cover natural rubber and synthetic elastomers.

In principle, any material is suitable which, on the one hand, eliminates or at least for the most part prevents a transmission of oscillations from the sensing stylus 7 or from the sleeve part 24 connected thereto to the outer sleeve part 23 and thereby the fixture 3, while, on the other hand, establishing a sufficiently stiff interconnection between the sleeve parts 23 and 24 for a firm and accurate guidance of the sensing stylus 7 in the taper sleeve 22.

A collet 27 is arranged in the through-bore 11 of the fixture 3 coaxially to the taper sleeve 22 and has an external thread 28 at an end thereof. The latter mates with the thread 17 provided at the inside of the bore 11. The diameter of the bore 27a in the collet 27 is somewhat larger than the external diameter of the shaft 7b of the sensing stylus 7. In this manner, a gap or interspace 29 of annular cross-section is provided between the shaft 7b of the sensing stylus 7 and the wall of the through-bore 27a. At its inside, the collet 27 is provided with a circular slot 30 which is open toward the bore 27a.

In that inwardly open slot, a damping element abutting the shaft 7b of the sensing stylus 7 is provided, and is shown at 31 in FIG. 4, at 32 in FIG. 5 and at 33 in FIG. 6. This damping element 31, 32 or 33 serves to guide the sensing stylus 7 on the one hand, and to suppress or prevent a transmission of oscillations of the sensing stylus 7 to the collet 27 and thereby to the fixture 3 on the other hand.

In the embodiment according to FIG. 4, the damping element 31 is an O-ring made of rubber. In the modification shown in FIG. 5, the damping element 32 is formed as a ring of synthetic material, such as "Teflon." FIG. 6 shows an embodiment in which the damping element 33 consists of a ring 34 formed of an elastically deformable, energy absorbent material, which preferably is an elastomer. A guide ring 35 of steel is on the inside of the damping or elastomer ring 34 and is connected thereto.

The mounting arrangements according to the invention shown in FIGS. 4 to 6 effect with the damping element 26 and 31, 32 or 33 a decoupling of the sensing stylus from the fixture 3 and thereby from the engraving stylus 8. As already mentioned, oscillations of the sensing stylus 7 are prevented by damping elements 26, 31, 32, or 33 from being transmitted to the outer sleeve part 23 or to the collet 27. The oscillation energy thereby is entirely or substantially absorbed by the damping elements 26 and 31, 32 or 33, respectively.

It is to be understood that different modifications of the emboidments described above are possible. By way of example, the damping elements 26, 31 and 32 need not be formed of one part as shown in FIGS. 4 and 5. Rather, in similarity to the showing of FIG. 6, multisectional embodiments are possible, whereby at least one of the sections consists of an elastically deformable, energy absorbing material.

It may be possible for certain applications to omit the damping elements 31, 32, 33 between the shaft 7b of the sensing stylus 7 and the collet 27.

Within the scope of the subject invention, a decoupling of the engraving stylus 8 from the sensing stylus 7 with respect to oscillations may be effected in a manner other than as specifically described, as long as there is provided between the sensing stylus 7 and the engraving stylus 8 a suitable damping means that operates as a barrier against oscillations emanating from the sensing organ 7 and as long as there still is the desired firm and accurate guidance of the controlled engraving tool or stylus 8 by the sensing organ or stylus 3 in a common mounting fixture 3.

I claim:

1. In an engraving head for apparatus for engraving printing cylinders, the improvement comprising in combination:
   a drivable engraving tool;
   a sensing organ contacting any printing cylinder being engraved by the drivable engraving tool;
   means for effecting a firm and accurate guidance of the drivable engraving tool by the sensing organ contacting the printing cylinder, including a common mounting fixture for the drivable engraving tool and the sensing organ; and
   damping means between the sensing organ and the engraving tool for at least substantially barring transmission of oscillations from the sensing organ to the engraving tool, while preserving said firm and accurate guidance of the drivable engraving tool
   by the sensing organ contacting the printing cylinder;
   said sensing organ including a sensing stylus, an inner sleeve for retaining the sensing stylus, and an outer sleeve for mounting the inner sleeve and the sensing stylus in the common mounting fixture; and
   said damping means including an elastically deformable, energy absorbent element between said inner and outer sleeves.
2. Engraving head as claimed in claim 1, wherein: said element includes an elastomer.
3. Engraving head as claimed in claim 1, wherein: said element includes a sleeve-like elastomer between said inner and outer sleeves.
4. Engraving head as claimed in claim 3, wherein: said sensing stylus is threaded in said inner sleeve and has a sensing tip projecting therefrom.
5. Engraving head as claimed in claim 4, wherein: said fixture has a through-bore containing said outer sleeve.
6. Engraving head as claimed in claim 5, wherein: said fixture and said through-bore have corresponding conical surfaces tapering toward said tip.
7. Engraving head as claimed in claim 1, including: a collet coaxial to said outer sleeve and encompassing the sensing stylus at a distance providing an interspace between the collet and the sensing stylus, and a damping organ between the collet and the sensing stylus for preventing transmission of oscillations from the sensing stylus to the common mounting fixture.
8. Engraving head as claimed in claim 7, wherein: said damping organ includes an elastomer.

* * * * *